Jan. 28, 1947.　　　C. S. GRIMSHAW　　　2,414,944
INTEGRATOR
Filed May 17, 1943
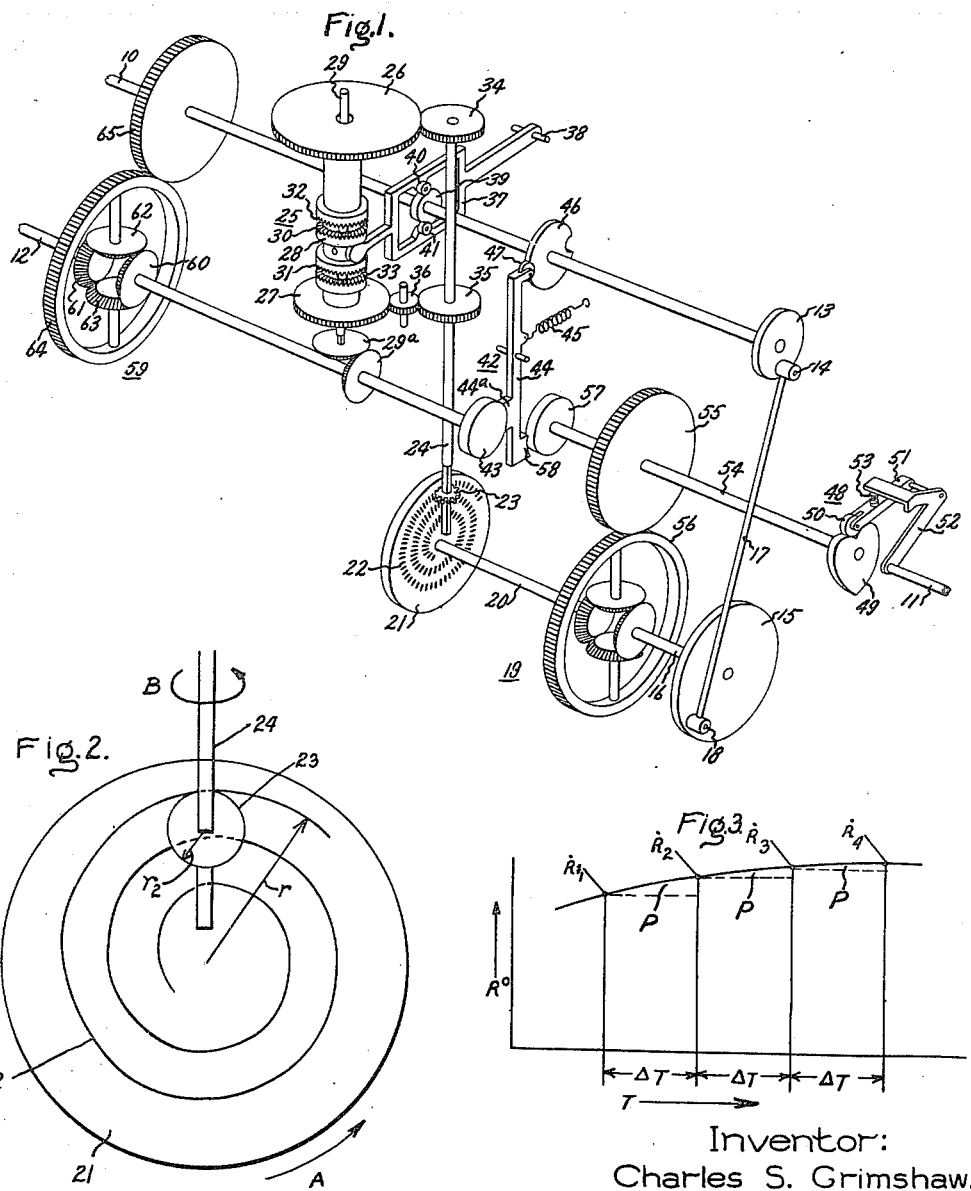
Inventor:
Charles S. Grimshaw,
by Harry E. Dunham
His Attorney.

Patented Jan. 28, 1947

2,414,944

UNITED STATES PATENT OFFICE 2,414,944

INTEGRATOR

Charles S. Grimshaw, Scotia, N. Y., assignor to General Electric Company, a corporation of New York Application May 17, 1943, Serial No. 487,308

5 Claims. (Cl. 235—61.5)

This invention relates to integrators, and it has for its object the provision of an integrator of simplified construction, and one that is positive and accurate in its operation.

While not limited thereto, this invention is particularly useful in the calculation of data for gunfire control; and in one particular application of this character it integrates with respect to time the magnitude of rate of change of the range of a target, whereby the value of range is obtained.

In accordance with this invention in one form thereof, a variable of integration input shaft drives a member to oscillate it in such a way that the variable of integration input is reversed at definite space intervals.

Connections are interposed between this oscillating member and an integration output shaft including reversing mechanism so that this output shaft is driven in step-by-step motion in a constant direction, irrespective of the reversals of the oscillating member.

The connection means between the oscillating member and the integration output shaft is controlled in accordance with the operation of an integrand input shaft so that this motion modifies that of the oscillating member to cause the output integration shaft to generate the integral of the integrand with respect to the variable of integration introduced by the input shaft.

The parts are constructed and arranged so that the integration output shaft is braked at the instants of reversals, at which times the motion of the integrand shaft is introduced, and at other times the output shaft is free to move, while the integrand input shaft is braked. Any motion of the integrand shaft prior to its release is absorbed in a motion absorbing device which releases this motion and permits its introduction at the moments of reversal.

For a more complete understanding of this invention, reference should be had to the accompanying drawing in which Fig. 1 is a perspective view illustrating an integrator arranged in accordance with this invention; and Figs. 2 and 3 are diagrammatic views which I will use to demonstrate the theory of operation of the integrator.

Referring to the drawing, this invention has been shown in one form as applied to an integrator comprising a variable of integration input shaft 10, an integrand input shaft 11, and an integration output shaft 12.

The input shaft 10 is driven at a substantially constant speed by any suitable timing mechanism (not shown). This shaft rotates a disk 13 which is provided with a crank pin 14 which is utilized to oscillate a disk 15 which is mounted on a shaft 16. The disk 15 has a diameter materially larger than has the disk 13, and the disk 13 is connected to the disk 15 by means of a connecting rod 17 which has its upper end, as viewed in the figure, pivoted to the crank pin 14 and its lower end pivoted to a crank pin 18 on the member 15. Inasmuch as the radius of the crank pin 18 is materially larger than is that of the crank pin 14, the continuous rotation of the input shaft 10 will give the disk 15 an oscillating motion. In other words, the input of the shaft 10 is reversed at definite space intervals by the member 15.

The oscillating member 15 through a shaft 16, a differential 19 and a shaft 20 drives a cam 21, which preferably will be referred to as a squaring cam. In other words, the oscillatory motion of the disk 15 is translated to the squaring cam 21 and oscillates it also. This squaring cam 21 is used to drive the integration output shaft 12 in a constant direction, but with a step-by-step motion. For this purpose, it is provided with a spiral gear rack 22 with which meshes a spur gear 23 that is splined upon a shaft 24; as shown, the gear 23 is provided with a square central opening which is received by a complementary section of the shaft 24 so that the gear 23 can move inwardly and outwardly radially with reference to the cam 21, and at the same time will rotate the shaft 24 when the cam 21 is rotated.

The operation of the squaring cam 21 may be better understood by reference to Fig. 2. The spiral gear rack 22 is wound with equal laps, that is, it is a uniform spiral. The radius of the rack is proportional to the rotation of the cam 21.

Now let $r$=radius to spiral rack 22
$K$=constant of cam 21
$A$=rotation of cam 21 in radians
$B$=rotation of gear 23 in radians
$r_2$=radius of gear 23

1. Then $r=KA$ by definition of $K$. The distance along the spiral track 22 traveled by the gear 23 is $Br_2$.

2. $Br_2=\int r dA$ substituting $r=KA$

3. $Br_2=\int KA dA$ solving $Br_2=\frac{K}{2}A^2+C$ or $B=\frac{K}{2r_2}A^2+\frac{C}{r_2}$ where $C$=a constant of integration.

4. $K_2=\frac{(K)}{2r_2}$ and $C_2=\frac{C}{r_2}$

The equation for B is

5. $B=K_2A^2+C_2$

Or the output of the cam is the input squared plus a constant.

For example, if shaft 10 turns as time (uniform speed) and shaft 11 as range rate R, then shaft 12 would turn as range R.

The shaft 24 drives the shaft 12 through a suitable reversing mechanism 25 which is operated responsively to the motion of the input shaft 10. This reversing mechanism is of the clutch type comprising a driving gear 26, a driving gear 27 and a movable clutch element 28. The element 28 is splined to a shaft 29 so that when the element is rotated by either of the gears 26 or 27, the shaft 29 will be rotated with it. The shaft 29 is positively geared to the shaft 12 through bevel gears 29a. It will be observed that the element 28 is provided with two sets of teeth 30 and 31 which are arranged to mesh with teeth 32 and 33 secured to the driving gears 26 and 27 respectively.

The driving gear 26 is driven by the shaft 24 through a spur gear 34, while the driving gear 27 is driven in an opposite direction by the shaft 24 through a spur gear 35 and an idler gear 36.

The reversal mechanism 25 is controlled from the shaft 10 so that while the gear cam 21 is oscillated, the shaft 12 will be driven in a constant direction. For this purpose, the element 28 is controlled by means of an oscillating frame 37 which is alternately moved up and down about its fixed pivot 38 by means of a cam 39 fixed to the shaft 10 and coacting with followers 40 and 41 in the frame 37.

By reason of the foregoing arrangement, if it be assumed that the gear 26 is under control by reason of the fact that the clutch element teeth 30 are in engagement with its teeth 32, then the gear cam 21 will operate the shaft 12 in one direction. When the gear cam 21 is reversed, the clutch element 28 is moved so that its teeth 31 engage the teeth 33, and then the gear 27 operates the shaft 29 to move the shaft 12 in the same direction as it had before even though the cam 21 is moving in the reverse direction. In this way, irrespective of the reversals of the input by the oscillator 15, the shaft 12 is driven in the same direction with a step-by-step motion.

At the instants of reversal of the input, the integration output shaft 12 is braked by a brake mechanism 42 comprising a brake wheel 43 on the shaft and a pivoted brake arm 44 having a brake shoe 44a that cooperates with the wheel 43. The arm 44 is biased toward the wheel 43 by means of a spring 45, and is operated away from it by a cam 46 operated by the input shaft 10 and which cooperates with a follower 47 on the brake arm 44. In other words, whenever the crank pin 14 is at the bottom or top of its stroke, the brake arm 44 moves its shoe 44a into engagement with the brake wheel 43 to brake momentarily the output integral shaft 12. More specifically, the cam 46 is provided with a pair of diametrally opposed depressions, as shown, into which the follower 47 falls each half revolution of the cam 46, and which are positioned so that the spring can force the shoe 44a into contact with the brake wheel 43 to brake the shaft 12 at the points of reversal of the input.

Movement of the integrand input shaft 11 is introduced into the system by rotating the spiral cam 21 to vary the radius of operation of the spur gear 23 with reference to the axis of rotation of the cam. It is not introduced while the spur gear is being rotated during an oscillation of the gear cam 21, because this would introduce an error into the output of the shaft 12, but it is introduced only at the instant of reversal when the output shaft is braked and the clutch element 28 is in its neutral position. In order to accomplish this, the integrand shaft 11 is mechanically connected to the shaft 20 of the gear cam 21 through the differential 19 and through a motion storing device 48. The motion storing device 48 comprises a heart cam 49 with which coacts a follower 50 that is mounted upon a follower arm 51. This arm 51 is pivoted to a crank arm 52 that is rotated by the shaft 11, and it is biased so as to force the follower 50 into contact with the periphery of the heart cam 49 by means of a compression spring 53. The heart cam 49 is mounted upon a shaft 54 which drives a gear 55 which in turn drives a gear 56 to move the spider of the differential 19 to add the motion of the shaft 11 to the motion of the input oscillating member 15.

In order that the motion of the shaft 11 will be introduced only at the instants of reversal, the shaft 54 is braked at all times except at these instants of time. For this purpose, the shaft 54 carries a brake drum 57 with which a shoe 58 on the brake arm 44 cooperates. The cam 46 on the input shaft 10 operates the shoe 58 into engagement with the drum 57 at all times except at the instants of reversal. In view of the foregoing construction, the shaft 11 may turn in the integrand at any time, but except at the instants of reversal, it will merely move the follower 50 about the periphery of the heart cam 51, the shaft 54 being braked. However, at the instants of reversal when the brake drum 57 is released the follower 50 will drop into the notch of the heart and actuate the cam 49 which motion will operate the differential 19 to vary the radius of operation of the gear 23.

In operation, during the first half of revolution of the shaft 10 there will be a first period during which the shaft 10 will drive the cam 21 through the oscillating disk—any motion of the shaft 11 at this time being stored in the motion storing device 48. At the end of the first half of the revolution, there will be a second period during which the output shaft 12 will be braked by the brake 42; the input will be changing the direction of motion; the clutch element 28 will be in its neutral position to allow both gears 26 and 27 to rotate freely; and the brake 42 will be released from the brake drum 57 so that the heart cam 49 will drive the differential 19 to adjust the radius operation of the gear 23 in accordance with the motion previously stored in the heart cam. During the second half of revolution of the input shaft 10 the same two periods follow, except that the cam 21 will rotate in the opposite direction.

In this way, the inputs of the shafts 10 and 11 impart to the integration output shaft 12 a step-by-step motion. This output measures the integral of the integrand introduced in the shaft 11 with respect to the variable of integration introduced by the shaft 10.

It is contemplated that this device will operate for both positive and negative values of the integrand introduced at shaft 11. It is not feasible to operate the spur gear 23 through the axis of rotation of the gear cam 21. And therefore, the zero position of the gear 23 has been arbitrarily chosen at some predetermined intermediate radial distance from the axis of rotation of the gear cam. The operation of the gear above this position, as viewed in the figure, will correspond, for example, to positive values of the integrand, while the operation at smaller radii will correspond to negative values of the integrand. It is, therefore, necessary to introduce a correction into the operation of the shaft 12 so that its motion will be zero when the gear 23 is at its chosen zero position. Therefore, any motion which would have been put into the shaft 12 by operation of the gear 23 at its arbitrarily chosen zero position is subtracted in a differential 59 which is operated from the input shaft 1. This differential comprises the input and output gears 60 and 61, and the spider gears 62 and 63 which are mounted on the spider gear 64. This gear 64 is driven by a spur gear 65 attached to the shaft 10, and it is driven in such a way that the differential subtracts the motion which would have been given to the shaft 12, because of the intermediate zero radial position of the driving gear 23.

It will be understood that when the gear 23 is operating below the chosen zero position because of the fact that the integrand has a negative value and shaft 11 has a negative setting, output shaft 12 will rotate in the reverse direction.

A mathematical analysis of the operation of the integrator is as follows:

By reference to Fig. 3, it will be understood that it is the function of the integrator to calculate the summation of the separate areas of the rectangles lying under the curve, that is to calculate $\Sigma \dot{R}_1 \Delta T + \dot{R}_2 \Delta T + \dot{R}_3 \Delta T \ldots$ The areas of the small triangles P located between the curve and the tops of the rectangles are neglected.

Now—

$K_3 \Delta T$ is rotation of shaft 12 from ½ revolution of time shaft 10.

$\Delta T$ is rotation of shaft 16 from ½ revolution of shaft 10.

$\dot{R}$ is rotation of shaft 20 from rotation of shaft 11 from range rate.

R is rotation of shaft 12.

The differential 19 adds the rotation of shaft 11 to the rotation of shaft 16 so that the input of the cam 21 for ½ revolution of shaft 10, hereafter called one step, is $\dot{R}_1 + \Delta T + K_4$, where $K_4$ is a constant added to the input of cam 21 to make the radius of the spiral rack manufacturable.

The next step of cam 21 is $\dot{R}_2 - \Delta T + K_4$, because of the reversal in direction of shaft 16.

The subscript on $\dot{R}$ is added because $\dot{R}$ can change at the end of each step, as shown in Fig. 3.

The input of the cam 21 is the summation of all the steps or $A = \Sigma(\dot{R}_1 + \Delta T + K_4) +$
$\qquad (\dot{R}_2 - \Delta T + K_4) + (\dot{R}_3 + \Delta T + K_4) \ldots$ Substituting in Equation 5, the output of the cam 21 is $B = K_2[\Sigma(\dot{R}_1 + \Delta T + K_4)^2 +$
$\qquad (\dot{R}_2 - \Delta T + K_4)^2 + (\dot{R}_3 + \Delta T + K_4)^2 \ldots] + C_2$ The output B is reversed after each step by reversing mechanism 25 so the rotation of gear 60 is=

$K_2[\Sigma(\dot{R}_1 + \Delta T + K_4)^2 -$
$\qquad (\dot{R}_2 - \Delta T + K_4)^2 + (\dot{R}_3 + \Delta T + K_4)^2 \ldots] + C_2$ Solving $K_2[\Sigma(2\dot{R}_1\Delta T + 2\dot{R}_2\Delta T \ldots) +$
$\qquad (2K_4 \Delta T + 2K_4 \Delta T \ldots)] + C_2$ The ratio of gear 65 to 64 is set so that the differential 59 subtracts $\Sigma 2K_4 \Delta T$, and $C_2$ is removed by the initial setting in shaft 12. $2K_2$ can be made one by proper gear ratio in difference between gear 60 and shaft 12 so rotation of shaft 12 is $R = \Sigma \dot{R}_1 \Delta T + \dot{R}_2 \Delta T \ldots$ No error is introduced by changing from $\dot{R}_1$ to $\dot{R}_2$ because this motion is lost when the brake 44 holds drum 43 and the reversing mechanism teeth 31 and 32 are not engaged.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. An integrator comprising a driving member, a second member oscillated by said driving member, a driven member, driving connection means between said second member and said driven member including a reversing mechanism operable responsively to said driving member for driving said driven member in a constant direction, and a member for controlling said driving connection means to effect a change in the speed ratio between said second member and said driving member in accordance with variations in the magnitude of a function.

2. An integrator comprising variable of integration input shaft, a member oscillated by said shaft at definite spaced intervals, an integration output shaft, a reversible driving connection means between said oscillating member and said output shaft controlled by said input shaft so that said output shaft is driven in a constant direction irrespective of the oscillations of said member, an integrand input shaft, and means for controlling said driving connection means in accordance with the operation of said integrand input shaft.

3. An integrator comprising a variable of integration input shaft, a member oscillated by said shaft at definite spaced intervals, an integration output shaft, a reversible driving connection means between said oscillating member and said output shaft controlled by said input shaft so that said output shaft is driven in a constant direction irrespective of the oscillations of said member, braking means for said output shaft controlled by said input shaft to brake said output shaft at the times of reversal of said oscillating member and said input shaft at said times having means for neutralizing said reversing driving connection means, an integrand input shaft, and means for controlling said driving connection means in accordance with the operation of said integrand input shaft so as to introduce the values of the integrand input at said instants of reversal.

4. An integrator comprising a variable of integration input shaft, a member oscillated by said shaft at definite spaced intervals, an integration output shaft, a reversible driving connection means including a differential interposed between said oscillating member and said output shaft controlled by said input shaft so that said output shaft is driven in a constant direction irrespective of the oscillations of said member, an integrand input shaft, a driving shaft connected with said differential, a motion storing connection between said driving shaft and integrand input shaft, braking means for said output shaft cotrolled by said input shaft to brake said output shaft at the times of reversal of said oscillating member and said input shaft at said times having means for neutralizing said driving connection means, and braking means for said driving shaft that connects said integrand input shaft and oscillating member controlled by said input shaft to brake the driving shaft at all times except at said times of reversal so that at said times any change in the motion of said integrand shaft is transferred by said motion storing connection to said oscillating member to change the speed ratio therebetween and said driving shaft.

5. An integrator comprising a variable of integration input shaft, a spiral gear, means for oscillating said spiral gear driven by said input shaft said means including a differential device, an integration output shaft, a shaft driven by said spiral gear, a reversing mechanism between said shaft and said output shaft operated by said input shaft so that said output shaft is driven step-by-step in a constant direction, means operated by said input shaft for braking said output shaft at the times of reversal of said spiral gear and for operating said reversing mechanism to a neutral condition at said times of reversal, an integrand input shaft, a heart cam and motion storing connection means between said integrand input shaft and said heart cam, connection means between said heart cam and said differential, braking means operated by said input shaft preventing the operation of said differential by said heart cam and motion storing means at all times except at said times of reversal, at which times said differential is operated by said heart cam and motion storing connection means to shift the position of said spiral gear in accordance with any prior variations in the position of said integrand input shaft in order to vary the speed ratio between said gear and said output shaft.

CHARLES S. GRIMSHAW.